United States Patent Office 3,222,298
Patented Dec. 7, 1965

3,222,298
INORGANIC POLYMER
Burton Peter Block, Wayne, and Joseph Simkin, Philadelphia, Pa., assignors to Pennsalt Chemicals Corporation, Philadelphia, Pa., a corporation of Pennsylvania
No Drawing. Filed Mar. 4, 1963, Ser. No. 262,378
6 Claims. (Cl. 260—2)

This invention relates to the field of inorganic polymers and is concerned in particular with a polymer which consists entirely of an inorganic backbone; i.e., the atoms in the polymer backbone consist entirely of inorganic atoms and the backbone is devoid of carbon atoms. The polymer of the invention is characterized by repeating units of the empirical formula:

$$[Zn_2[NH(C_5H_4N)_2](RPO_3)_2]_n$$

where R is a hydrocarbon containing from one to six carbon atoms and selected from the group consisting of alkyl, cycloalkyl and aryl; e.g., methyl, ethyl, butyl, hexyl, cyclohexyl, phenyl and the like and $n$ is an integer from 1 to 2.

The polymer of this invention results unexpectedly from the reaction of 2,2'-iminodipyridinediacetatozinc(II) with an alkyl or aryl phosphonic acid, as for example, phenylphosphonic acid. Such a reaction would be expected to produce a product having the empirical formula $$Zn[NH(C_5H_4N)_2]C_6H_5PO_3$$

However, the product obtained contains exactly one-half the expected amount of the 2,2'-iminodipyridine moiety and corresponds therefore to a polymer having the empirical formula $Zn_2[NH(C_5H_4N)_2](C_6H_5PO_3)_2$. The zinc atoms in subject polymer are of a tetrahedral configuration and have the normal coordination number of 4. Thus, one-half of the zinc atoms are chelated by the 2,2'-iminodipyridine as a ligand and the remaining two coordination sites of the zinc atoms are coordinated to oxygen atoms of different phenylphosphonate anions. The remaining zinc atoms which are not bonded to the 2,2'-iminodipyridine moiety form four bonds to oxygen atoms of the phenylphosphonate anions. This results in a polymeric configuration, and the polymer is one which corresponds to maximum utilization of potential donor groups, assuming, of course, that the iminonitrogen is not available as a donor atom because of steric reasons. The structural description is applicable to more than one specific repeating unit of the formula given above and such repeating units which characterize the polymer are illustrated within the broken lines of the following structures where

indicates the 2,2'-iminodipyridine moiety and R is a hydrocarbon group as defined above:

I. Repeating unit $Zn_4[NH(C_5H_4N)_2]_2(OP-O_2)_4$

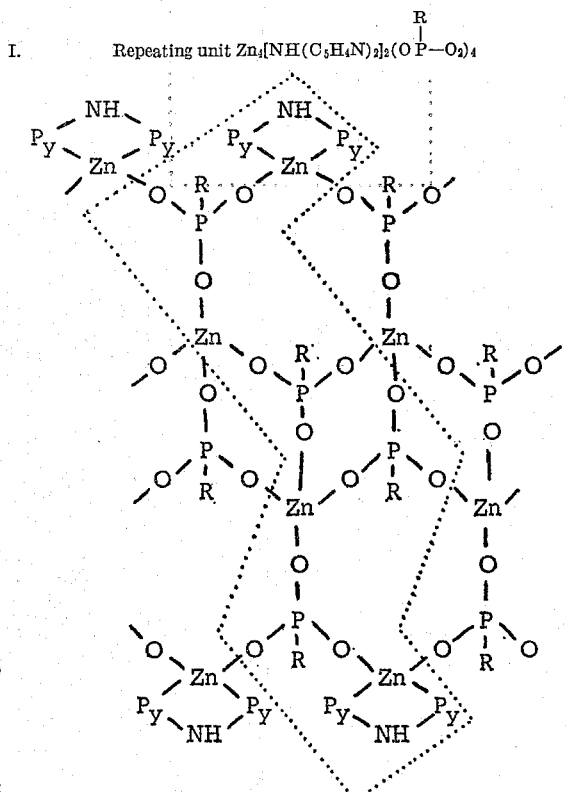

II. Repeating unit $Zn_2[NH(C_5H_4N)_2](O-P-O_2)_2$

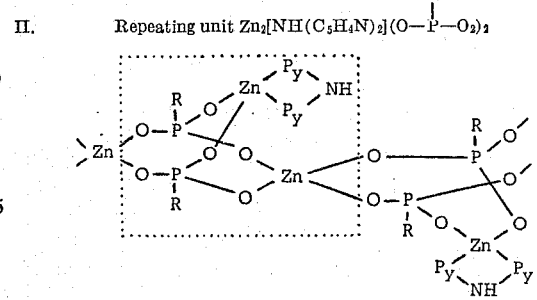

III. Repeating unit $Zn_2[NH(C_5H_4N)_2](O-P-O_2)_2$

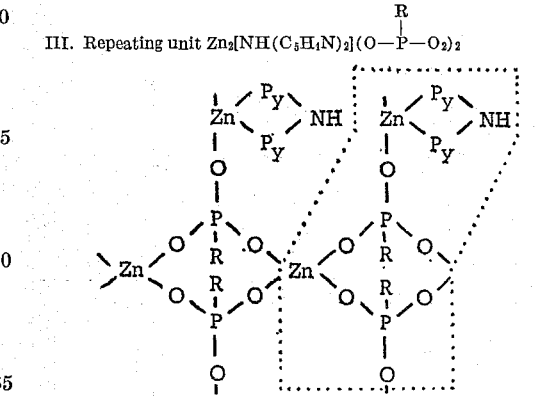

IV. Repeating unit $Zn_4[NH(N_5H_4N)_2]_2(O-\underset{\underset{R}{|}}{P}-O_2)_4$

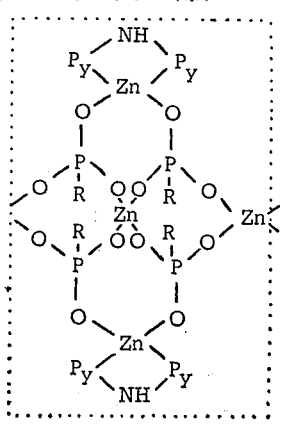

It will be understood that a specific polymer will incorporate one or more of the above described repeating units and the number of repeating units will range from about 10 to about 200.

The polymer has very good thermal stability and it is therefore useful in shaped forms at temperatures where ordinary organic polymers fail. Thus, the polymer may be shaped into gaskets, O-rings, and the like, and used in those applications where thermal stability is important. Shaping the polymer is readily accomplished by hot pressing at 350° C. at about 10 tons per square inch pressure.

The method by which the polymer is formed is straightforward, requiring simply that a solution of phenylphosphonic acid in a solvent such as a lower aliphatic alcohol (e.g. methanol, ethanol, etc.), be added to a solution (e.g. a lower aliphatic alcohol) of 2,2'-iminodipyridinediacetatozinc(II). Alternatively, the phenylphosphonic acid may be added to a mixture of zinc acetate and the 2,2'-iminodipyridine in methanol. The reaction occurs readily at room temperature and a gelatinous white precipitate forms which is separated and purified by washing with alcohol and then dried. The product itself is a free-flowing white solid which is completely stable at temperatures of 285° C. at which point some loss of weight is shown when subjected to analysis by thermogravimetric techniques. In a capillary tube no melting is observed up to 500° C. although some decomposition is seen to occur at this temperature. The polymer is unaffected by moisture and is insoluble in all solvents except those which are strongly coordinating such as pyridine and N,N-dimethylformamide and such solvents have a degrading effect on the polymer.

The invention is further illustrated by reference to the following examples.

*Example 1*

A solution of 3.53 g. (0.0225 mole) of phenylphosphonic acid dissolved in 50 ml. of methanol was added dropwise with stirring to a solution of 7.97 g. (0.0225 mole) of 2,2'-iminodipyridinediacetatozinc (II) in 150 ml. of methanol. The gelatinous white precipitate which formed was filtered off, washed with hot methanol, and dried at 95–100° C. in an air oven. The yield was 6.0 g. or 87% based on the weight of acid.

The infrared spectrum of $$Zn_2[NH(C_5H_4N)_2](C_6H_5PO_3)_2$$

shows strong absorption bands at 1481 and 1433 cm.$^{-1}$ due to the iminodipyridine moiety. Other strong bands are located at 1073 (P-O), 1065 (P-O), 1005, and 993 cm.$^{-1}$ (P-Ph); very strong absorptions occur at 1124 (P→O), 1111 (P→O), and 1085 cm.$^{-1}$ (P→O).

The X-ray powder pattern shows strong lines corresponding to the following interplanar spacings (A.) with $I/I_0 \times 100$ indicated in parentheses: 12.4 (100), 6.7 (15), 6.0 (35), 5.2 (10), 4.86 (35), 3.67 (20), 3.46 (10), 3.14 (10), and 2.91 (20).

*Example 2*

A solution of 1.6 g. (0.01 mole) of phenylphosphonic acid in 50 ml. of methanol was slowly added with stirring to a solution made by dissolving 2.2 g. (0.01 mole) of $Zn(OAc)_2 \cdot 2H_2O$ and 1.7 g. (0.01 mole) of 2,2'-iminodipyridine in 100 ml. of hot methanol. The gelatinous precipitate was treated as in Example 1 to give 2.7 g. of product having infrared and X-ray powder patterns identical to those for the product of Example 1.

| Analyses | Percent Zn | Percent P | Percent N |
|---|---|---|---|
| Product of Example 1 | 21.0 | 9.7 | 6.9 |
| Product of Example 2 | 21.6 | 10.0 | 6.8 |
| Calcd. for $Zn_2[NH(C_5H_4N)_2](PhPO_3)_2$ | 21.29 | 10.09 | 6.84 |

*Example 3*

When 0.96 g. (0.01 mole) of methylphosphonic acid is substituted for the phenylphosphonic acid in Example 2, the polymer produced is similar to that of Example 1 and has the empirical formula $$Zn_2[NH(C_5H_4N)_2](CH_3PO_3)_2$$

Instead of using phenylphosphonic acid as in Example 2, n-butylphosphonic acid and cyclohexylphosphonic acid may be used to obtain polymers which have good thermal stability.

It will be understood that in practicing the invention, numerous changes may be made from the above description and examples without departing from the spirit and scope of the invention herein described.

We claim:

1. A polymer having an inorganic backbone consisting of zinc, oxygen and phosphorus atoms consisting of repeating units of the formula $$[Zn_2[NH(C_5H_4N)_2](RPO_3)_2]_n$$

where $C_5H_4N$ is a pyridine moiety, R is hydrocarbon containing one to six carbon atoms selected from the group consisting of alkyl, cycloalkyl, and aryl, and $n$ is an integer from one to two.

2. A polymer as in claim 1 where R is phenyl.
3. A polymer as in claim 1 where R is methyl.
4. The process of reacting 2,2'-iminodipyridinediacetatozinc(II) and a phosphonic acid of structure $$RPO(OH)_2$$

where R is a hydrocarbon containing from one to six carbon atoms selected from the group consisting of alkyl, cycloalkyl, and aryl and thereby obtaining the polymer of claim 1.

5. The process of claim 4 wherein the phosphonic acid is phenylphosphonic acid.

6. The process of claim 4 wherein the phosphonic acid is methylphosphonic acid.

References Cited by the Examiner

Block et al.: Inorganic Chemistry, vol. 2, 1963, pp. 688–690.

MURRAY TILLMAN, *Primary Examiner.*

SAMUEL H. BLECH, *Examiner.*